(12) United States Patent
Takase et al.

(10) Patent No.: US 7,620,740 B2
(45) Date of Patent: Nov. 17, 2009

(54) STORAGE DEVICES AND METHOD OF TRANSFERRING FILE BETWEEN THE DEVICES

(75) Inventors: Makoto Takase, Kanagawa (JP); Kohji Takasaki, Kanagawa (JP); Minoru Hashimoto, Kanagawa (JP); Kenji Okada, Kanagawa (JP); Hiroshi Oshikawa, Kanagawa (JP); Yasuhiro Kotani, Kanagawa (JP); Satoshi Yamamoto, San Jose, CA (US); Keishi Takahashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 11/084,693

(22) Filed: Mar. 18, 2005

(65) Prior Publication Data

US 2005/0207253 A1    Sep. 22, 2005

(30) Foreign Application Priority Data

Mar. 18, 2004    (JP)    ............................. 2004-078569

(51) Int. Cl.
   *G06F 17/00*    (2006.01)
(52) U.S. Cl. ................................. 710/2; 710/33; 710/62
(58) Field of Classification Search ................. 711/114, 711/112
   See application file for complete search history.

(56) References Cited

U.S. PATENT DOCUMENTS

| 5,519,882 | A | | 5/1996 | Asano et al. |
| 5,777,811 | A | * | 7/1998 | Bodo ........................... 360/15 |
| 5,784,644 | A | * | 7/1998 | Larabell ........................ 710/9 |
| 6,012,130 | A | * | 1/2000 | Beyda et al. ................. 711/173 |
| 6,131,141 | A | * | 10/2000 | Ravid ........................ 711/112 |

(Continued)

FOREIGN PATENT DOCUMENTS

JP    07-281838    10/1995

(Continued)

OTHER PUBLICATIONS

ASUS, CUSL2 User's Manual, 2000, ASUSTek Computer Inc., p. 114.*

(Continued)

*Primary Examiner*—Henry W. H. Tsai
*Assistant Examiner*—Cheng-Yuan Tseng
(74) *Attorney, Agent, or Firm*—Townsend and Townsend and Crew LLP; John Henkhaus

(57) ABSTRACT

A file is transferred directly between a parent magnetic-disk device and a child magnetic-disk device. In one embodiment, a parent magnetic-disk device has a host-mode execution program, whereas a child magnetic-disk device is capable operating in a device mode as is the case with an ordinary magnetic-disk device. The parent magnetic-disk device has an operating-mode-setting unit including a special-purpose jumper block. An MPU employed in the parent magnetic-disk device executes the host-mode execution program to put the parent magnetic-disk device in a host mode. At an activation time, the MPU refers to the logic of the special jumper block to start an operation in the host mode. The MPU controls the parent magnetic-disk device to directly transfer a file to the child magnetic-disk device. Thus, the file can be transferred between the parent and child magnetic-disk devices without intervention by a host computer.

15 Claims, 7 Drawing Sheets

U.S. PATENT DOCUMENTS

| | | | |
|---|---|---|---|
| 6,188,571 B1 * | 2/2001 | Roganti et al. | 361/685 |
| 6,346,676 B1 * | 2/2002 | Caldwell | 174/117 F |
| 6,397,293 B2 * | 5/2002 | Shrader et al. | 711/114 |
| 6,425,049 B1 * | 7/2002 | Yamamoto et al. | 711/112 |
| 6,480,953 B1 * | 11/2002 | Hughes | 713/1 |
| 6,728,751 B1 * | 4/2004 | Cato et al. | 709/202 |
| 6,868,496 B2 * | 3/2005 | Sales et al. | 713/193 |
| 7,095,402 B2 * | 8/2006 | Kunii et al. | 345/169 |
| 7,287,182 B2 * | 10/2007 | Tanaka et al. | 714/7 |
| 2003/0204770 A1 * | 10/2003 | Bergsten | 714/5 |

FOREIGN PATENT DOCUMENTS

| | | |
|---|---|---|
| JP | 2000-347816 | 12/2000 |
| JP | 2001-243167 | 9/2001 |
| JP | 2003-015785 | 1/2003 |
| JP | 2005107675 A * | 4/2005 |

OTHER PUBLICATIONS

Chen et al., RAID: High-Performance, Reliable Secondary Storage, ACM Computing Surveys, vol. 26, No. 2, Jun. 1994, pp. 145-185.*

Tom's Hardware Guide, DDR400 for Athlon: A Comparison of 9 Motherboards, 2002, pp. 1-49.*

* cited by examiner

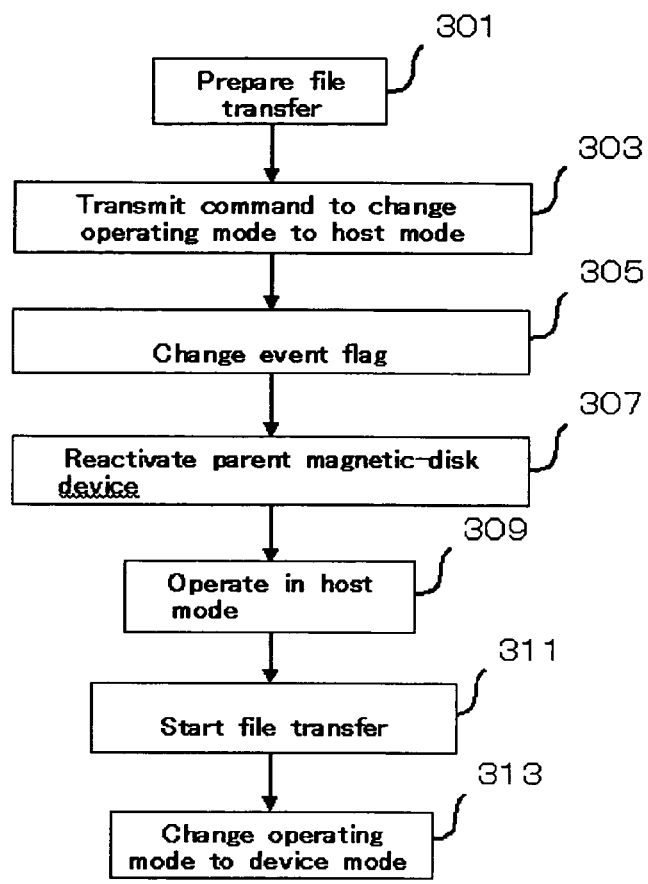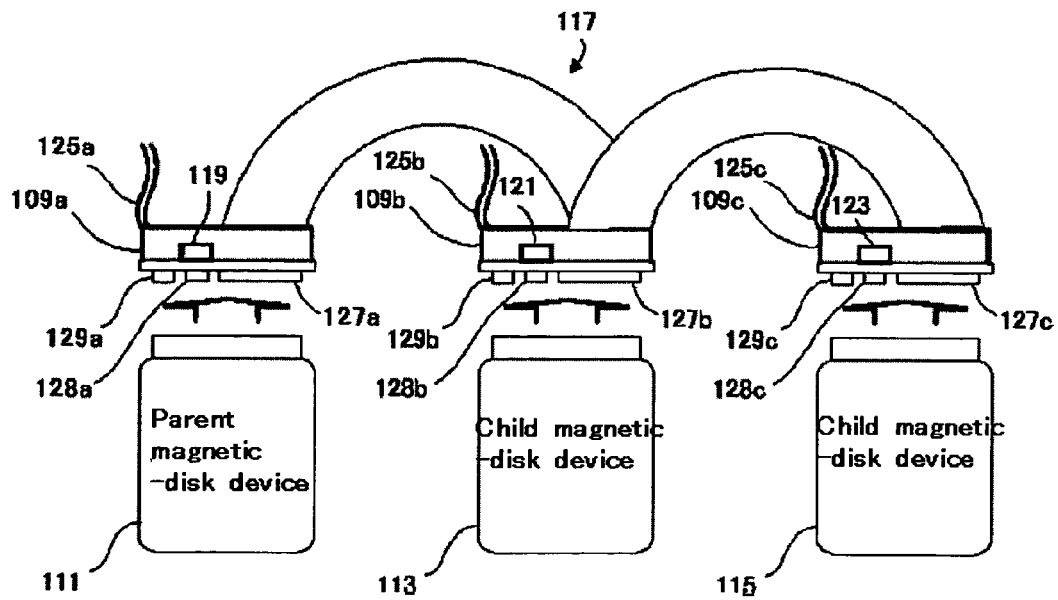

STORAGE DEVICES AND METHOD OF TRANSFERRING FILE BETWEEN THE DEVICES

CROSS-REFERENCES TO RELATED APPLICATIONS

This application claims priority from Japanese Patent Application No. JP2004-078569, filed Mar. 18, 2004, the entire disclosure of which is incorporated herein by reference.

BACKGROUND OF THE INVENTION

The present invention relates to a technology of transferring a file between storage devices such as magnetic-disk devices and opto-magnetic-disk devices. More particularly, the present invention relates to a technology of directly transferring a file between storage devices.

Generally employed as an external storage device of a host computer, a magnetic-disk device and an opto-magnetic-disk device can each be used for storing a large amount of data. These storage devices normally include an embedded processor for carrying out advanced information processing. However, the processing carried out by the embedded processor is limited to a range for executing control of internal operations on the basis of instructions received from a host computer in a passive manner. When a storage device is replaced due to device aging or another reason, it is necessary to copy data stored in the storage device being replaced to another storage device. In this case, it is necessary to execute a procedure for once transferring the data stored in the storage device being replaced to a host computer and then transferring the data from the host computer to the other storage device. Such a procedure entails the use of host-computer resources such as a CPU, a memory, and a bus. In addition, the user must bear a heavier burden such as the need to operate the host computer and consideration to prevent a trouble from being generated in the entire system of the host computer.

Moreover, during a time period between completion of the assembly of the storage device at the manufacturing stage and a state in which the storage device can be shipped to the user as a complete product, it is necessary to carry out a large number of optimization and inspection processes such as adjustments, optimizations of parameters, and/or inspections. Traditionally, special test apparatus are used for carrying out the optimization and inspection processes. However, production of such storage devices in volume in accordance with this method raises problems that a large investment in the test apparatus is required and the time it takes to carry out the optimization and inspection processes becomes longer.

Japanese Patent Laid-open No. 2003-15782 discloses a technology providing a first operating mode and a second operating mode. The first mode allows an electronic apparatus to function as a host, and the second operating mode allows the electronic apparatus to function as a peripheral. In accordance with a determination result produced by a determining means for determining the type of a power supply connected to the electronic apparatus, the first operating mode is inhibited. The inhibition is in order to prevent the electronic apparatus from entering a state of being incapable of functioning right after the start of the electronic apparatus to function as the host.

Japanese Patent Laid-open No. 2000-347816 discloses a technology of using a multi-communication line or a switch for connecting a loop control unit to magnetic-disk devices. In an environment providing a configuration wherein each of the magnetic-disk devices is capable of operating as an SCSI target or initiator, data is transferred among the magnetic-disk devices. With this technology, a control apparatus is capable of carrying out processing based on a request received from a host computer even while data is being transferred among the disk devices. This patent document describes the fact that a specific magnetic-disk device receives a command from the loop control unit to operate as an initiator. However, this patent document includes neither concrete description revealing how data can be transferred to another magnetic-disk device nor concrete method for switching a magnetic-disk device from the function of a target to that of the initiator in order to transfer data. In addition, the data transfer described in the patent document is carried out in accordance with a command received from a host apparatus such as the loop control unit in an environment connecting the magnetic-disk devices to the host apparatus.

BRIEF SUMMARY OF THE INVENTION

A storage device, which is connected to a host computer as is the case with the magnetic-disk device described above, normally operates in a so-called device mode instead of operating in a so-called host mode. The device mode exhibits passive behaviors in response to a command received from the host computer. On the contrary, the host mode exhibits active behaviors to transfer data to another storage device and receive data from another storage device. Even if the storage device can be provided with two operating modes, i.e., the device and host modes, a means for switching the operating mode from the device mode to the host mode and vice versa safely and smoothly is required.

It is thus a feature of the present invention to provide a storage device that has the two operating modes, i.e., the device and host modes, and is capable of switching the operating mode from the device mode to the host mode and vice versa safely. It is another feature of the present invention to provide a storage device that is capable of operating in the host mode to directly transfer data to another storage device and to carry out optimization/inspection processing on another storage device. It is a further feature of the present invention to provide a method to be adopted by such a storage device as a method of directly transferring data to another storage device.

The storage device provided by the present invention has an operating-mode-setting unit capable of setting a host mode or a device mode and a host-mode execution program as well as a device-mode execution program. At a power-on time, a processor employed in the storage device refers to an operating mode set by the operating-mode-setting unit in order to invoke either the host-mode execution program or the device-mode execution program. Thus, the storage device is capable of switching the operating mode from the device mode to the host mode and vice versa. As described above, the storage device has the two operating modes, i.e., the device and host modes, and is capable of switching the operating mode from the device mode to the host mode and vice versa when the power supply is turned on.

The host mode of a storage device is an operating mode allowing the storage device to carry out operations for another storage device in the same way as a host computer does. To put it concretely, the host mode is an operating mode provided to a storage device such that the storage device operates as an active device to another storage device. Therefore, the storage device makes an access to the other storage device in order to carry out processing such as an operation to write a file into the other storage device, an operation to read out a file from the other storage device, and an adjustment. On the other hand, the device mode is the normal operating mode provided to a storage device such that the storage device operates as a passive device to a host computer. Therefore, the storage device carries out processing such as an operation to write a file, an operation to read out a file, and an adjustment in accordance with a command received from the host computer. A storage device starting the host mode is capable of functioning as an active device making an access to another storage device to adjust the transfer of a file.

A file of a storage device includes user data and system data, which are recorded in the storage device, firmware related to operations of the storage device, programs, and all information held by the storage device. The information includes the determination of the storage device and adjustment parameters. A file of the storage device is actually recorded or stored in a recording medium employed in the storage device. Examples of the recording medium are a magnetic disk or a semiconductor memory.

Storage devices include all random-accessible rotating disk storage devices such as a magnetic-disk device, an opto-magnetic-disk device, and a floppy-disk device. It is to be noted that the word 'floppy' is a trademark. However, the range of the present invention is by no means limited to these storage devices. That is to say, the present invention can also be applied to other storage devices including a semiconductor device as long as the other storage devices each include a processor. A direct transfer of a file is an operation carried out by a storage device operating in the host mode to mainly transfer the file to another storage device and receive the file from the other storage device. A direct transfer of a file is carried out not only in a configuration in which an interface connector of the storage device on the transmission side is directly connected to an interface connector of the storage device on the reception side, but also to a configuration for transferring the file by way of another apparatus.

The operating-mode-setting unit can be implemented by a block of jumpers or a flag set in a non-volatile memory. By providing a configuration in which the processor employed in the storage device executes a start-up routine to always make an access to the operating-mode-setting unit right after the power supply is turned on, it is possible to have the processor execute a host-mode execution program. Thus, the storage device operates in the host mode when the power supply of the processor or the power supply of the whole storage device is turned on. The processor operating in the host mode controls configuration elements employed in the storage device. The elements relates to control such as control of operations to input and output data and control to position a head in processing to exchange data with another storage device and processing to optimize/inspect another storage device.

The present invention provides a storage device that has the two operating modes, i.e., the device and host modes, and is capable of switching the operating mode from the device mode to the host mode and vice versa safely. The present invention also provides a storage device that is capable of operating in the host mode to directly transfer data to another storage device and to carry out optimization/inspection processing on another storage device. The present invention further provides a method to be adopted by such a storage device as a method of directly transferring data to another storage device.

BRIEF DESCRIPTION OF THE DRAWINGS

FIG. 6 shows a flowchart representing a procedure for directly transferring a file between a parent magnetic-disk device and a child magnetic-disk device in accordance with a command received from a host computer.

FIG. 7 is a diagram showing a connection for generating a clone device by directly transferring files between magnetic-disk devices.

DETAILED DESCRIPTION OF THE INVENTION

Description of Magnetic-Disk Devices

Figure 1:
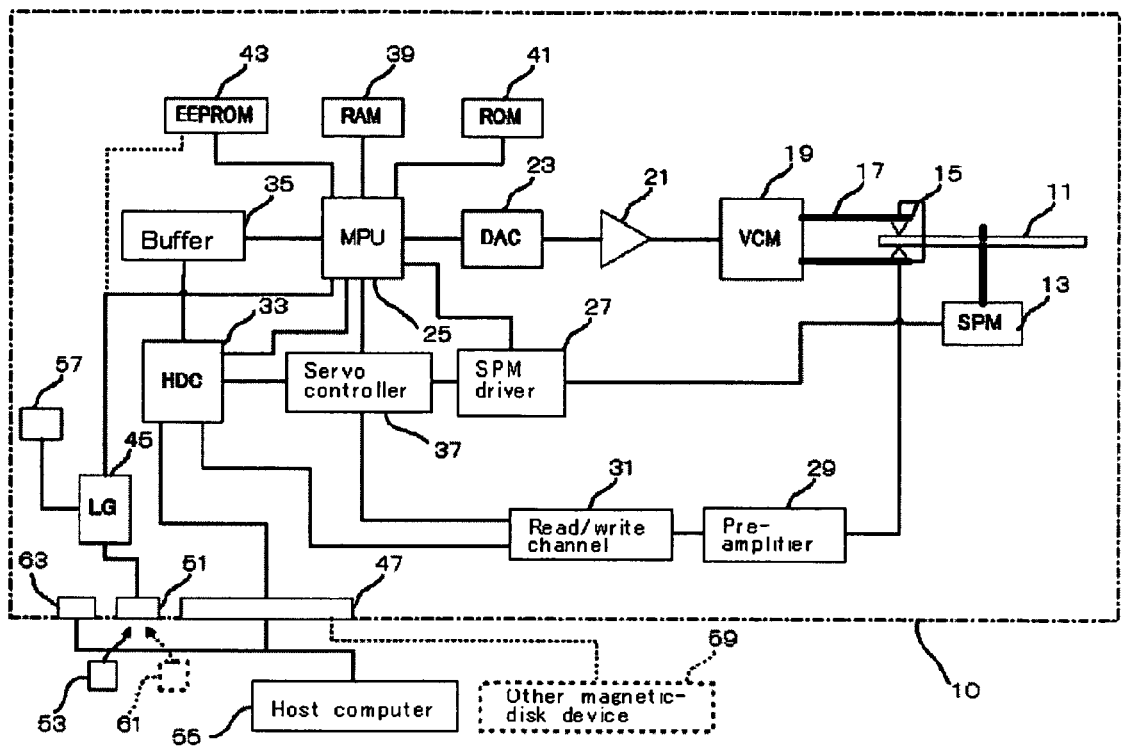
FIG. 1 is a block diagram showing main configuration elements composing a magnetic-disk device implemented by an embodiment of the present invention.

A storage device implemented by an embodiment of the present invention is explained by taking a magnetic-disk device as an example. FIG. 1 is a block diagram showing main configuration elements composing the magnetic-disk device 10. The magnetic-disk device 10 implemented by this embodiment of the present invention has two operating modes, i.e., a host mode and a device mode. The host mode is an operating mode allowing the magnetic-disk device to carry out an operation of transferring data to another magnetic-disk device in the same way as a host computer does. To put it concretely, the host mode is an operating mode provided to a magnetic-disk device such that the magnetic-disk device operates as an active device to another magnetic-disk device. Therefore, the device makes an access to the other magnetic-disk device in order to carry out processing such as an operation to write a file into the other magnetic-disk device, an operation to read out a file from the other magnetic-disk device, and an adjustment. On the other hand, the device mode is the normal operating mode provided to a magnetic-disk device such that the magnetic-disk device operates as a passive device to a host computer or another magnetic-disk device operating in the host mode. Therefore, the device carries out processing such as an operation to write a file, an operation to read out a file, and an adjustment in accordance with a command received from the host computer or the other magnetic-disk device operating in the host mode. The magnetic-disk device 10 has a function to operate in the host mode. When the magnetic-disk device 10 is operating in the device mode, however, the user can utilize the magnetic-disk device 10 as an ordinary magnetic-disk device.

A file in this specification includes user data and system data, firmware related to operations of the magnetic-disk device, programs, and all information held by the magnetic-disk device. The information includes the determination of the magnetic-disk device and adjustment parameters. A file of the magnetic-disk device is actually recorded or stored in a recording medium such as a magnetic disk or a semiconductor memory. In addition, throughout this specification, each element is denoted consistently by the same reference numeral assigned to the element.

The magnetic-disk device 10 operates as a parent magnetic-disk device in the host mode but operates as a child magnetic-disk device in the device mode. A magnetic disk 11 used as a recording medium has recording faces each made of a magnetic layer on both sides respectively. A magnetic disk or a plurality of magnetic disks forming a lamination layer structure is attached to a spindle hub. A spindle motor 13, which is abbreviated hereafter to an SPM, rotates the spindle hub. On each of the recording faces of the magnetic disk 11, a plurality of concentric tracks is created. Each of the tracks is divided in the circumferential direction into sectors or blocks. The sectors or the blocks are each used as a data-writing/reading unit.

For each of the sectors, a physical block address (PBA) and a logical block address (LBA) are defined. The PBA indicates a physical location on the magnetic disk 11. On the other hand, the LBA is an address recognized by the host computer as a logical order number in a file. A magnetic head 15 comprises independent conversion devices or a shared conversion device. One of the independent conversion devices converts an electrical signal into a magnetic signal in an operation to write data onto the magnetic disk 11. On the other hand, the other independent conversion device converts a magnetic signal into an electrical signal in an operation to read out data from the magnetic disk 11. The shared conversion device is a device common to the operations to write and read out data onto and from the magnetic disk 11. While supporting the magnetic head 15, an actuator assembly 17 moves to a predetermined track on the magnetic disk 11 to convey the magnetic head 15 to the track.

A voice coil motor 19 abbreviated hereafter to a VCM comprises a voice coil, a voice coil magnet, and a voice coil yoke. The voice coil is a coil on which the actuator assembly 17 is mounted. The voice coil magnet and the voice coil yoke are mounted on the base of the magnetic-disk device 10. A current flowing through the voice coil controls the movement of the actuator assembly 17. A VCM driver 21 converts an analog voltage signal received from a digital-analog converter 23 abbreviated hereafter to a DAC into a current for driving the VCM 19. The DAC 23 converts a digital signal received from a micro processing unit 25 abbreviated hereafter to an MPU as a signal for positioning the magnetic head 15 into the analog voltage signal.

A spindle-motor driver 27 abbreviated hereafter to an SPM driver has a DA converter for converting a digital signal received from the MPU 25 into an analog current for driving the SPM 13. A pre-amplifier 29 amplifies a weak analog reproduction signal reproduced by the magnetic head 15 from the magnetic disk 11 in a reproduction process. Then, the pre-amplifier 29 supplies an amplified reproduction signal to a read/write channel 31 abbreviated hereafter to a R/W channel. Conversely, the pre-amplifier 29 amplifies an analog write signal received from the read/write channel 31 and supplies an amplified write signal to the magnetic head 15 in a recording process.

The read/write channel 31 carries out data processing on data to be recorded onto the magnetic disk 11 and data reproduced from the magnetic disk 11. To put it in detail, digital data output by a host computer 55 to the magnetic-disk device 10 as data to be recorded onto the magnetic disk 11 is supplied to the read/write channel 31 by way of a hard disk controller 33 abbreviated hereafter to an HDC. The read/write channel 31 converts the digital data received from the HDC 33 into a write current and supplies the write current to the pre-amplifier 29. Conversely, the read/write channel 31 converts a reproduction signal received from the magnetic head 15 by way of the pre-amplifier 29 into digital data and transmits the digital data to the host computer 55 by way of the HDC 33. A servo controller 37 extracts information on the position of the magnetic head 15 from read data output by the read/write channel 31 and supplies the information to the MPU 25 as well as the HDC 33.

The HDC 33 carries out a function of an interface for communicating with the host computer 55. To be more specific, the HDC 33 adjusts the speed of data exchanged with the host computer 55 to the speed of data processing carried out in the magnetic-disk device 10. To put it concretely, the HDC 33 temporarily stores transferred data received from the host computer 55 in a buffer 35 to be supplied later to the read/write channel 31 in accordance with a command received from the MPU 25. Conversely, the HDC 33 temporarily stores transferred data received from the read/write channel 31 in the buffer 35 to be supplied later to the host computer 55 in accordance with a command received from the MPU 25. In addition, the HDC 33 includes a data error correction circuit and an address-mark detection circuit.

The HDC 33 also includes a variety of registers for communicating data with the host computer 55. To be more specific, when the magnetic-disk device 10 operates in the device mode, the HDC 33 receives data and a command conforming to predetermined interface specifications from the host computer 55 or another magnetic-disk device 59. The registers are used for storing the data and the command. When the magnetic-disk device 10 operates in the host mode, on the other hand, data and a command to be transmitted to the other magnetic-disk device 59 are stored in the registers.

In collaboration with the HDC 33, the MPU 25 controls operations carried out by the magnetic-disk device 10 as a whole. To put it in detail, the MPU 25 makes direct accesses to the registers employed in the HDC 33 in controlling data transfers between the magnetic-disk device 10 and the host computer 55 or the other magnetic-disk device 59. The MPU 25 has a variety of registers used for executing a command conforming to predetermined specifications such as ATA and SCSI specifications. The magnetic-disk device 10 is capable of operating in not only the device mode but also in the host mode. For that reason, the MPU 25 employed in this embodiment has a configuration capable of executing a host-mode execution program for transmitting a command and data to an external destination.

The MPU 25 also has a status register referred to in determining whether the operating mode is the host or device mode. The magnetic-disk device 10 receives the logical block address (LBA) of a location on the magnetic disk 11, and the MPU 25 converts the LBA into a physical block address (PBA). In addition, the MPU 25 determines the current position of the magnetic head 15 from servo information received from a servo controller 37. The MPU 25 finds a difference between the current position and a target position computed from an address specified in a command received from the host computer 55 or the other magnetic-disk device 59. Then, the MPU 25 supplies a digital signal based on the difference to a digital-to-analog converter 23 abbreviated hereafter to a DAC.

A read-only semiconductor memory 41 abbreviated hereafter to a ROM is used for storing firmware such as the host-mode execution program and a device-mode execution program, which are to be executed by the MPU 25 to implement the host and device modes respectively. The host-mode execution program and the device-mode execution program can also be stored in a system-data area of the magnetic disk 11. A random-access memory 39 abbreviated hereafter to a RAM serves as a main memory used for temporarily storing a program being executed by the MPU 25 and used as a work area of the MPU 25.

An electrically erasable and programmable ROM 43 abbreviated hereafter to an EEPROM is used for storing information peculiar to the magnetic-disk device 10 and information on setting states. The information peculiar to the magnetic-disk device 10 includes a model name, a serial number, a firmware version, a protocol in use, and a manufacturer name. On the other hand, the information on setting states includes information on power management, information on a write or look-ahead caching, information on a write or read buffer. In this specification, the information peculiar to the magnetic-disk device 10 and the information on setting states are referred to as drive information. The drive information can be referenced as inquiry data in the AT interface system and sense data in the SCSI interface system.

The EEPROM 43 is also used for storing data such as an error log and an event log. The errors and events of the logs stored in the EEPROM 43 have been detected in the magnetic-disk device 10. The EEPROM 43 is also used for storing performance data and a servo log of the magnetic-disk device 10 in addition to a host log. These pieces of information on the operating performance are referred to as operation information in this specification. Furthermore, the EEPROM 43 can also be used for storing an event flag and an address or identifier of a magnetic-disk device. The event flag shows whether the magnetic-disk device 10 is operating in the host or device mode. The address or identifier serves as a destination of a transfer of a file. A value to be set in the event flag and information such as a write address can be received from the host computer 55 when the magnetic-disk device 10 operates in the device mode. The processor is capable of referring to the value and the information when the power supply of the magnetic-disk device 10 or the MPU 25 is turned on. The EEPROM 43 is further used for storing the LBA of each bad sector and the LBA of a sector designated as a substitute for the bad sector.

A special-purpose jumper block 53, a general-purpose jumper block 61, a jumper connector 51, and a logic-gate circuit 45 form an operating-mode-setting unit of the magnetic-disk device 10. If the EEPROM 43 is used for setting the event flag relating to the operating mode, the EEPROM 43 is also a portion of the operating-mode-setting unit.

In general, a jumper block has a configuration for connecting a plurality of jumper pins on a jumper connector to put some specific ones of the jumper pins in a short-circuit state. The user then mounts a general-purpose jumper block 61 on the jumper connector 51 and operates the magnetic-disk device 10 in the device mode to set a variety of conditions. By properly selecting jumper pins to be put in a short-circuit state, the user can selectively set a variety of functions. To put it concretely, the user can selectively set a master, slave, or cable-select function, selectively set a security function in a state of being enabled or disabled, and selectively set a capacity limit.

Figure 2:
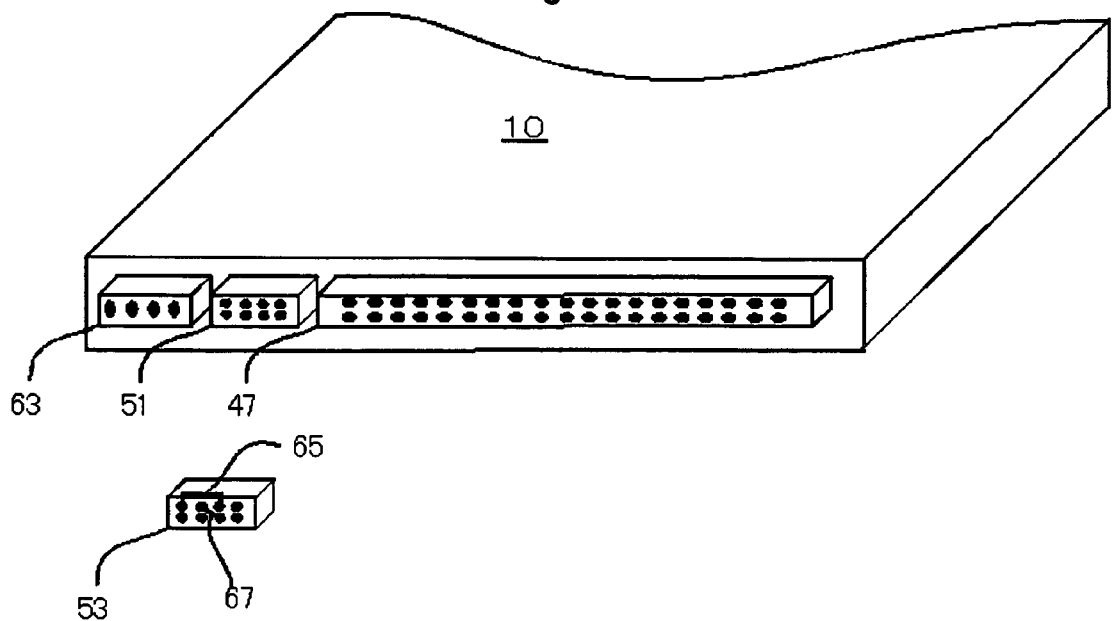
FIG. 2 is a diagram showing a perspective view of a jumper block and a jumper connector, which are employed in the magnetic-disk device.

The user is allowed to mount the general-purpose jumper block 61 on the jumper connector 51 employed in the magnetic-disk device 10 or, as an alternative, mount the special-purpose jumper block 53 provided by this embodiment on the jumper connector 51. The special-purpose jumper block 53 has a special pin configuration allowing a short-circuit state to be formed for jumper pins as a short-circuit state not provided in the general-purpose jumper block 61. The special pin configuration of the special-purpose jumper block 53 drives the magnetic-disk device 10 to operate in the host mode. In addition, the configuration allows a command to be issued for selecting a function of the host mode to be executed. FIG. 2 is a diagram showing a perspective view of the jumper connector 51 and the jumper block 53. The jumper block 53 shown in FIG. 2 is set in a configuration in which pins separated from each other by a middle pin are put in a short-circuit state by a jumper 65, and other pins provided at positions connected to each other by a line resembling a diagonal are put in a short-circuit state by a jumper 67.

Such a configuration of the special-purpose jumper block 53 does not exist in the general-purpose jumper block 61. The host mode is an operating mode not utilized by the user. That is to say, the user cannot set the function of the host mode unless the special-purpose jumper block 53 is used. It is also possible to use a dip switch in place of a jumper connector. A dip switch is convenient in that the dip switch allows an operating mode to be set with ease. However, a dip switch requires a means such as a cover for preventing the dip switch from being set inadvertently. A power-supply connector 63 is provided at a location adjacent to the jumper connector 51 as a connector for supplying power to the magnetic-disk device 10.

Each connector pin on the jumper connector 51 is connected to the logic-gate circuit 45. The logic-gate circuit 45 comprises AND, OR, and NAND gates for inputting connector-pin logic states such as short and open states formed in the special-purpose jumper block 53 or the general-purpose jumper block 61. The logic-gate circuit 45 creates new logic states from the input logic states. The logic-gate circuit 45 then supplies the newly created logic states to I/O ports of the MPU 25.

The output of the logic-gate circuit 45 can also be supplied to the MPU 25 by way of the HDC 33. Logic states are supplied from the logic-gate circuit 45 to the I/O port of the MPU 25 through wires connected to the I/O ports in a pull-up connection state or a pull-down connection state. In the MPU 25, the logic states are stored in a status register as if special data were written into the register. In addition, instead of employing the logic-gate circuit 45, the jumper connector 51 can also be connected directly to the I/O ports of the MPU 25. Since the logic-gate circuit 45 works as a decoder, the logic-gate circuit 45 allows a larger number of functions in the host mode to be set for the MPU 25.

Furthermore, the value of the event flag included in the EEPROM 43 as a flag for setting an operating mode can be supplied directly to an I/O port of the MPU 25 or as an input to the logic-gate circuit 45. By including the EEPROM 43 in the operating-mode-setting unit for changing the event-flag data received from the host computer 55, a function can be set by the operating-mode-setting unit with a higher degree of freedom. In addition, a function can be set by combining the data of the event flag included in the EEPROM 43 with a logic state of the logic-gate circuit 45. The ability to set a large number of functions lets the magnetic-disk device 10 offer more convenience that detailed functions can be implemented when the magnetic-disk device 10 is operated as a parent magnetic-disk device. In addition, while communicating with the other magnetic-disk device 59 operating as a child magnetic-disk device, the magnetic-disk device 10 is capable of transferring data to the other magnetic-disk device 59 and carrying out optimization/inspection processes on the other magnetic-disk device 59.

A password can be required in an operation to write data into the event flag of the EEPROM 43 from the host computer 55 or the other magnetic-disk device 59 operating in the host mode. In that case, data can be prevented from being mistakenly set by an unauthorized user into the event flag. In general, a display unit 57 comprises one LED or a plurality of LEDs. The display unit 57 is provided on the outer side of an enclosure enclosing the magnetic-disk device 10. The display unit 57 displays information such as the start of a data transfer, the amount of transferred data, the end of a data transfer, and a generated error in accordance with a variety of commands issued by the MPU 25.

The host computer 55 is an electronic apparatus, which uses the magnetic-disk device 10 as an external storage device or an auxiliary storage device. The host computer 55 is connected to the magnetic-disk device 10 through an interface connector 47 according to an interface system so that data can be exchanged between the host computer 55 and the magnetic-disk device 10. The interface connector 47 conforms to specifications such as the ATA (AT Attachment), serial-ATA, SCSI (Small Computer System Interface), or Fibre Channel specifications. The other magnetic-disk device 59 has the same basic configuration as the magnetic-disk device 10. The other magnetic-disk device 59 also has two operating modes, i.e., the host and device modes. If the other magnetic-disk device 59 is used only as a child magnetic-disk device, it is not necessary to provide the other magnetic-disk device 59 with the host mode.

When the magnetic-disk device 10 operates in the device mode, the magnetic-disk device 10 exchanges files with the host computer 55 in accordance with a command received from the host computer 55. That is to say, in a write operation, the magnetic-disk device 10 receives a write command and data to be stored in the magnetic disk 11 from the host computer 55 and writes the data into the magnetic disk 11 at an address specified in the write command. In a read operation, on the other hand, the magnetic-disk device 10 receives a read command from the host computer 55, reads out data stored in the magnetic disk 11 from an address specified in the read command, and transfers the data to the host computer 55. The operations described above are also carried out in the same way when the magnetic-disk device 10 operating in the device mode is connected to the other magnetic-disk device 59, which operates in the host mode, through the interface connector 47. The magnetic-disk device 10 may also operate in the host mode as a parent magnetic-disk device. In this case, the magnetic-disk device 10 exchanges files by way of the interface connector 47 with the other magnetic-disk device 59 operating in the device mode as a child magnetic-disk device. A child magnetic-disk device may exchange data with two or more parent magnetic-disk devices through a data transmission line based on bus connection or daisy-chain connection. If a transmission line conforming to the Fibre-Channel specifications is used, it is also possible to provide a configuration allowing two or more magnetic-disk devices to communicate with each other through a connection implementation. The connection implementation is based on a peer-to-peer (point-to-point) topology, a fabric topology, an arbitrated loop topology, or a combination of these topologies.

A typical block diagram showing the magnetic-disk device 10 implemented by an embodiment of the present invention has been explained so far. However, the names of blocks composing the magnetic-disk device 10, the function of each block, relations between the blocks, and other descriptions have been given merely as examples. Thus, the concept of the present invention is by no means limited to the descriptions given above. That is to say, by referring to this invention specification, a person skilled in the art is capable of adding other functions, realizing the function of a block by using another block, desegregating a block into sub-blocks, and integrating blocks into a larger single block. However, such addition of other functions, such realization of the function of a block by using another block, such desegregation of a block into sub-blocks, and such integration of blocks into a larger single block do fall into the range of the present invention.

Figure 3:
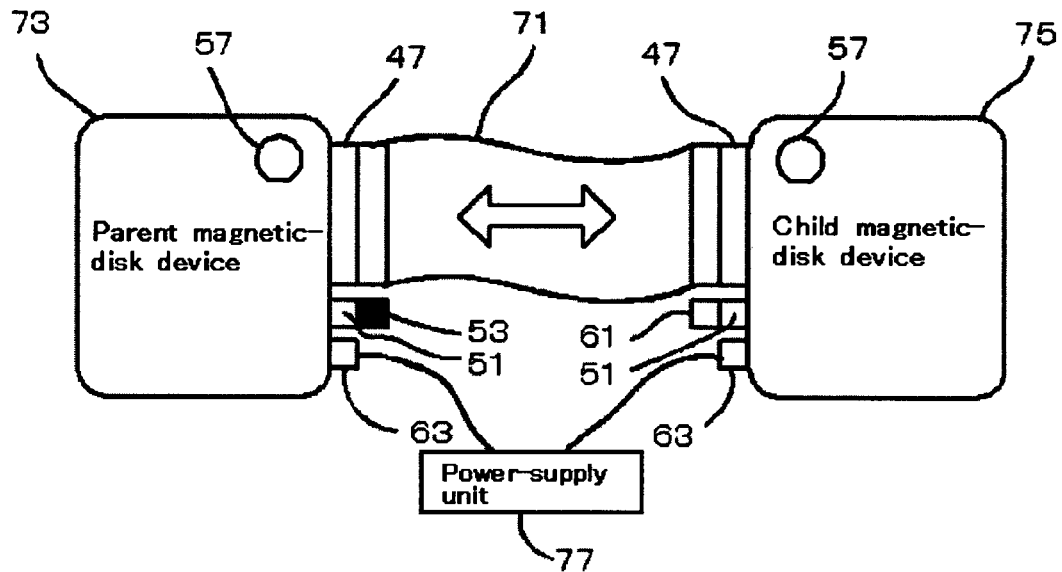
FIG. 3 is a diagram showing a connection used for directly transferring a file between a parent magnetic-disk device and a child magnetic-disk device.
Figure 4:
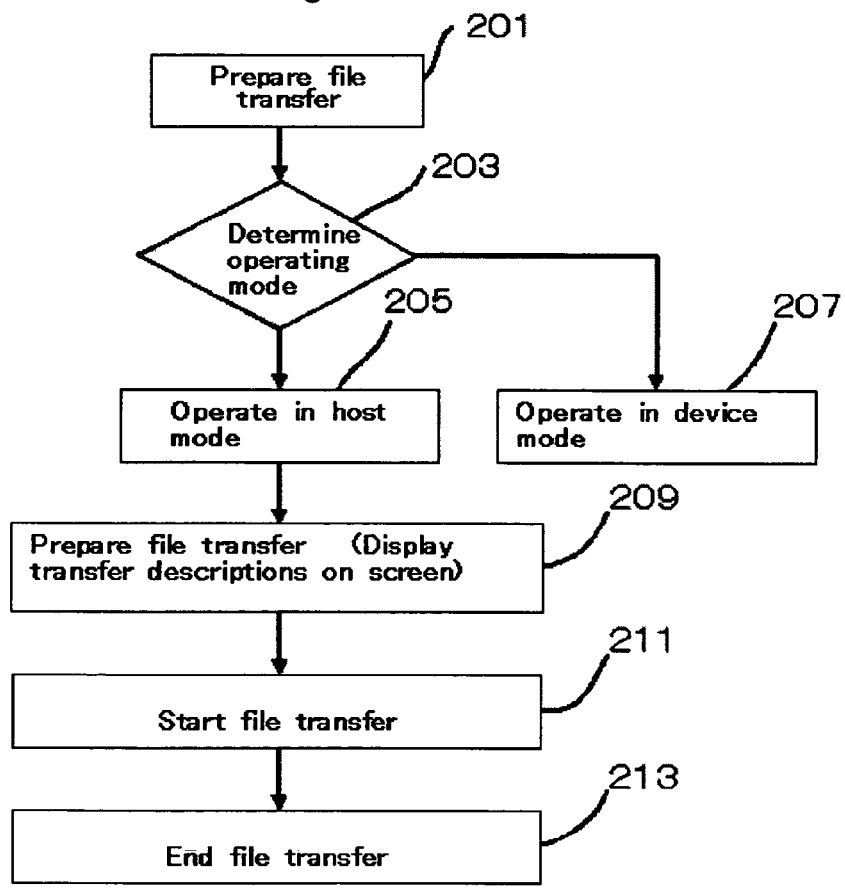
FIG. 4 shows a flowchart representing a procedure for directly transferring a file between a parent magnetic-disk device and a child magnetic-disk device.

Description of Direct File Transfers between Parent and Child Magnetic-Disk Devices By referring to FIGS. 3 and 4, the following description explains direct transfers of files between a parent magnetic-disk device and a child magnetic-disk device. FIG. 3 is a diagram showing a connection used for directly transferring files between a parent magnetic-disk device 73 and a child magnetic-disk device 75. FIG. 4 shows a flowchart representing the procedure for the direct transfer. The parent magnetic-disk device 73 has the same configuration as the magnetic-disk device 10, which is capable of operating in the host mode as explained earlier by referring to FIG. 1. To the child magnetic-disk device 75, the parent magnetic-disk device 73 operates as an active device or a principal device, initiating exchanges of various kinds of data with the child magnetic-disk device 75.

The child magnetic-disk device 75 is an ordinary magnetic-disk device operating in the device mode as a passive device to a host computer. In this embodiment, the child magnetic-disk device 75 receives commands from the parent magnetic-disk device 73 and operates as a passive device to the parent magnetic-disk device 73. In this embodiment, both the parent magnetic-disk device 73 and the child magnetic-disk device 75 adopt the ATA interface method. The magnetic-disk device 10 explained earlier by referring to FIG. 1 is capable of operating selectively in the host or device mode. On the other hand, the child magnetic-disk device 75 of the embodiment has the same configuration as the magnetic-disk device 10 operating only in the device mode. Each of the parent magnetic-disk device 73 and the child magnetic-disk device 75 comprises the display unit 57, the interface connector 47, the jumper block 51, and a power-supply connector 63. The magnetic-disk device 10 is capable of operating as the parent magnetic-disk device 73 or the child magnetic-disk device 75 in dependence on the type of a jumper block attached to the jumper connector 51.

The flowchart shown in FIG. 4 begins with a processing block 201 in which a transfer of data is prepared. In this block, the special-purpose jumper block 53 is mounted on the jumper connector 51 of the parent magnetic-disk device 73 whereas the general-purpose jumper block 61 is mounted on the jumper connector 51 of the child magnetic-disk device 75. The interface connector 47 of the parent device 73 is connected to the connector 47 of the child device 75 by an ATA-interface cable 71. The power-supply connector 63 of the parent device 73 and the connector 63 of the child device 75 are connected to a power-supply unit 77. In the configuration shown in FIG. 3, the parent magnetic-disk device 73 is connected directly to the child magnetic-disk device 75. However, the parent device 73 can also be connected to the child device 75 through another apparatus provided such that the resulting configuration allows a file to be transferred directly between the parent device 73 and the child device 75. A file is transferred between two magnetic-disk devices in a process wherein one of the magnetic-disk devices functions as an active device initiating the file transfer operation and transfers the file to the other magnetic-disk device or receives the file from the other magnetic-disk device.

Then, in the next processing block 203, the power supplies of the parent magnetic-disk device 73 and the child magnetic-disk device 75 are turned on. The parent device 73 does not start a transfer operation till the child device 75 completes the preparation of a file transfer. Therefore, the power supply of the parent device 73 can be started before power supply of the child device 75 or vice versa. As the parent magnetic-disk device 73 is activated, the parent device 73 reads out an activation program from the ROM 41 and initializes registers employed in the MPU 25 and registers employed in the HDC 33. Then, the parent magnetic-disk device 73 executes a start-up routine for starting a self-diagnosis program. The activation program has a configuration to always read out a status register employed in the MPU 25 during the execution of the start-up routine. Thus, in the next processing block 205, the MPU 25 reads out contents of the status register.

The contents of the status register reflect a logic state of the special-purpose jumper block 53 or a logic state formed by a combination of the special-purpose jumper block 53 and the logic-gate circuit 45. In this case, the contents of the status register are set to operate the parent magnetic-disk device 73 in the host mode. In addition, the contents of the status register may include data of setting a write transfer, data of setting a read transfer, a specification of the type of a transferred file, data of setting a dead copy and a defragmentation copy, and data of setting functions to be executed by the parent magnetic-disk device 73. The defragmentation copy will be explained later. The type of a transferred file may contain, among others, user data stored in the magnetic disk 11 employed in the parent device 73 or the child device 75, firmware stored in the ROM 41, or drive information and operation information, which are stored in the EEPROM 43.

As the MPU 25 employed in the parent magnetic-disk device 73 verifies that the contents of the status register indicate that the operating mode is the host mode, the flow of the procedure goes on to a processing block 205. A host-mode execution program is loaded from the ROM 41 or the magnetic disk 11 into the RAM 39 so as to allow the parent magnetic-disk device 73 to start the host mode. If the MPU 25 employed in the child magnetic-disk device 75 verifies by the jumper block 61 that the contents of the status register is the device mode, on the other hand, the flow of the procedure goes on to a processing block 207. The child magnetic-disk device 75 starts operations in the device mode. The host-mode execution program includes all functions carried out by the MPU 25 to exchange files with the child magnetic-disk device 75 by operating in the host mode. The operations carried out by the parent magnetic-disk device 73 in the host mode are determined by information set by the operating-mode-setting unit and the host-mode execution program. In this embodiment, the operating mode is switched from the host mode to the device mode and vice versa by selecting a program invoked at a power-on time. A plurality of programs may exist as programs related to a basic operation carried out by the magnetic-disk device in operating modes such as the host and device modes. In that case, a transition of an operation from an operation of a specific one of the programs in the course of execution to an operation of another one of the programs entails a danger. In addition, such a transition requires a complicated procedure. In this embodiment, however, such a transition can be executed safely and smoothly.

The host-mode execution program includes a procedure for transferring a file in accordance with an ATA command, the address of a transferred file, differences between a PIO transfer (Program I/O transfer) and a multi-word DMA (Direct Memory Access) transfer, a display appearing on the display unit 57 during a file transfer, and error handling in the event of an error. In a processing block 209, a description of a file direct transfer is displayed on a screen showing information set by the operating-mode-setting unit and contents of the host-mode execution program. Examples of the description of a file direct transfer are information indicating that: the direction from the parent magnetic-disk device 73 to the child magnetic-disk device 75 has been selected as the transfer direction; all user data has been selected as the transferred file; a defragmentation copy has been selected with the PIO transfer adopted as the transfer method; and the display unit 57 exhibits a screen in a blinking red color during the file transfer, and the display unit 57 exhibits a screen in a green color after completion of the file transfer.

Other examples of the description of a file direct transfer are information indicating that: the direction from the child magnetic-disk device 75 to the parent magnetic-disk device 73 has been selected as the transfer direction; drive information has been selected as the transferred file; a multi-word DMA has been selected as the transfer method; and the display unit 57 exhibits a screen in a green color after completion of the file transfer. The child magnetic-disk device 75 may have information different from that of the parent magnetic-disk device 73. Examples of the different information are the manufacturer of the magnetic-disk device, the firmware version, and the capacity, which cause incompatibility. If drive information is selected as a transferred file, the different information can be copied from the parent magnetic-disk device 73 to the child magnetic-disk device 75. Thus, in spite of such incompatibility, the child magnetic-disk device 75 can be used in the same operating environment as the parent magnetic-disk device 73.

A transfer of a file is explained below by taking a transfer of user data from the parent magnetic-disk device 73 to the child magnetic-disk device 75 as an example. A transfer of a file in the opposite direction and a transfer of a file of a type different from user data can also be implemented with the parent magnetic-disk device 73 operating as a principal device. An example of a transferred file is firmware executed to carry out basic operations of the parent magnetic-disk device 73 or the child magnetic-disk device 75. In this case, the firmware is ported from one of the devices to the other device by adoption of a commonly known method. To put it concretely, the firmware is copied to the magnetic disk 11 or EEPROM 43 employed in the transfer-recipient device. When the power supply of the transfer-recipient device is turned on next time, the existing firmware is replaced with the transferred firmware copied to the magnetic disk 11 or EEPROM 43. As the operation carried out in the processing block 209 to prepare the transfer is completed, in the next processing block 211, the parent magnetic-disk device 73 starts a process to write the user data into the child magnetic-disk device 75.

In the parent magnetic-disk device 73, the MPU 25 executing the host-mode execution program transmits an ATA command for transferring the user data to the child magnetic-disk device 75. The parent device 73 starts the user-data transfer described in the program in accordance with a predetermined procedure. At that time, the MPU 25 displays a blinking screen in a red color on the display unit 57. If a dead copy of the magnetic disk 11 is specified as a transfer method, the user data is transferred in accordance with an order of sector physical locations or an order of PBAs. A sector may be used as a substitute for a defective sector in the sequence of the PBA locations, or an unused sector may exist in the sequence of the PBA locations due to fragmentation. In the case of the dead copy, the user data is copied to the same PBA locations on the magnetic disk 11 employed in the child device 75 as the PBA locations on the magnetic disk 11 employed in the parent device 73. The process of a dead copy is carried out in accordance with the order of cylinder positions and the order of magnetic-disk rotations. Thus, seek operations and rotation wait states are not required. As a result, in a dead copy, data can be transferred at a high speed.

If a defragmentation copy of the magnetic disk 11 is specified as a transfer method, on the other hand, data of a file is transferred in accordance with a logical order of the file. In this case, if a sector is used as a substitute for a defective sector in the sequence of the PBA locations, data is read out from the substitute sector and transferred as data stored in the defective sector. In addition, if a sector in a fragmented state exists, data of the file is transferred in accordance with a logical order of the file. In a defragmentation copy, data of a file is transferred in accordance with a logical order of the file. Thus, data of a file is transferred in accordance with the logical order of the file in the defragmentation copy. The magnetic head 15 employed in the parent device 73 repeatedly carries out a seek operation and repeatedly enters a rotation wait state. Therefore, the parent device 73 prolongs the time to transfer the data. In the storage state of the file written on the magnetic disk 11 employed in the child magnetic-disk device 75, however, the logical order matches the order of sector physical locations. Thus, an access to the file can be made at a high speed due to shortened seek times and shortened rotation-wait times.

In addition, a special-purpose jumper block 53 can be mounted on the child magnetic-disk device 75 completing the defragmentation copy to drive the child device 75 to operate as a parent magnetic-disc device. Then, user data can be transferred to another child magnetic-disk device in a dead copy. In this case, the user data already defragmented can be written onto the magnetic disk 11 employed in the other child magnetic-disk device at a speed of the dead copy. In a processing block 213 after the transfer of the user data is completed, the MPU 25 employed in the parent magnetic-disk device 73 displays a green screen on the display unit 57. On the other hand, the user data, which is content embedded in the host-mode execution program, can be written onto the magnetic disk 11 employed in the child magnetic-disk device 75.

In the procedure represented by the flowchart shown in FIG. 4, the special-purpose jumper block 53 or a combination of the special-purpose jumper block 53 and the logic-gate circuit 45 is used as the operating-mode-setting unit. In the processing block 203, the MPU 25 determines the operating mode by reading out data set in a status register as data representing the special-purpose jumper block 53 or the like. As an alternative, it is also possible to provide a configuration in which, instead of using the special-purpose jumper block 53, an event flag indicating an operating mode is stored in the EEPROM 43 in advance. The start-up routine of the activation program always reads out the event flag from the EEPROM 43. As another alternative, parameters of the host-mode execution program are stored in advance in the EEPROM 43 as a part of the host-mode execution program. The parameters include the type of transferred data, a transfer method, information indicating a read/write transfer, and information indicating a PIO transfer or a multi-word DMA transfer. If event flags stored in the EEPROM 43 are used as an operating-mode setting unit, a number of parameters can be set more flexibly than the use of the special-purpose jumper block 53 and the logic-gate circuit 45.

In the configuration of this embodiment, the parent magnetic-disk device 73 and the child magnetic-disk device 75 form a pair. However, a plurality of child devices 75 can also be connected to the parent device 73 through a bus or the like. In this case, a function of selecting one of the child devices 75 can be included in the host-mode execution program of the parent device 73.

Figure 5:
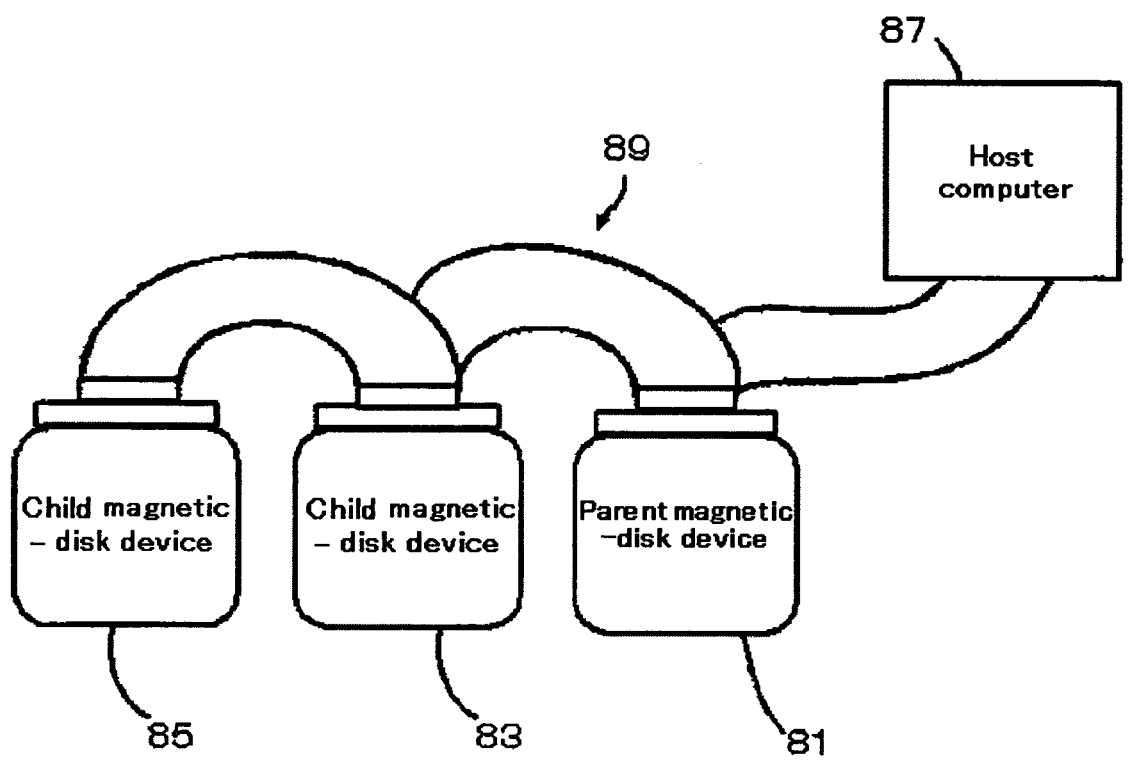
FIG. 5 is a diagram showing a connection for directly transferring a file between a parent magnetic-disk device and a child magnetic-disk device in accordance with a command received from a host computer.

Description of File Direct Transfer Commanded by the Host Computer as a Transfer between the Parent Magnetic-Disk Device and the Child Magnetic-Disk Device By referring to FIGS. 5 and 6, the following description explains another embodiment implementing direct transfers of files among a plurality of magnetic-disk devices 81, 83, and 85 connected to a host computer 87. In a file-transfer preparation carried out in a processing block 301 of a flowchart shown in FIG. 6, the magnetic-disk devices 81, 83, and 85 are connected to the host computer 87 as shown in FIG. 5. The magnetic-disk devices 81, 83, and 85 each have all the same configuration as the magnetic-disk device 10 explained earlier by referring to FIG. 1. Thus, the magnetic-disk devices 81, 83, and 85 each include the host-mode execution program and the device-mode execution program. This embodiment is different from the embodiment explained earlier in that the magnetic-disk devices 81, 83, and 85 each adopt the SCSI interface and execute SCSI commands. In addition, this embodiment selects the host or device mode in accordance with a command issued by the host computer 87 instead of selecting an operating mode in accordance with the special-purpose jumper block 53. The magnetic-disk devices 81, 83, and 85 are connected to each other by using an SCSI cable 89 in a daisy-chain configuration. When power is supplied to the magnetic-disk devices 81, 83, and 85, they operate in accordance with a command issued by the host computer 87.

In the processing block 301, an event flag is set in every EEPROM 43 so as to operate each of the magnetic-disk devices 81, 83, and 85 in the device mode. That is to say, the magnetic-disk devices 81, 83, and 85 each operate in the device mode as an external storage device of the host computer 87. Any specific one of the devices 81, 83, and 85 is capable of functioning as an active device transferring a file to the any other one of the devices to operating the specific device in the host mode. Now assume that the host computer 87 selects the magnetic-disk device 81 as a parent magnetic-disk device but selects each of the devices 83 and 85 as a child magnetic-disk device. The following description explains a case in which the parent magnetic-disk device 81 directly transfers a file to the child magnetic-disk devices 83 and 85 through the SCSI cable 89.

In a processing block 303, the host computer 87 selects the parent magnetic-disk device 81 by transmitting a host-mode-setting command, which specifies the SCSI-ID of the parent device 81, to the parent device 81. Receiving the host-mode-setting command, the parent magnetic-disk device 81 loads the host-mode execution program from the ROM 41 into the RAM 39. The host-mode-setting command includes a sub-command for setting the event flag in the EEPROM 43 and a sub-command for reactivating the parent magnetic-disk device 81. In accordance with the SCSI specifications, the host-mode-setting command is not a standard command. The host-mode-setting command may further include the SCSI-IDs of the child magnetic-disk devices 83 and 85 to which a file is to be transferred by the parent magnetic-disk device 81. With the above configuration, it is possible to select each of the child devices 83 and 85 to receive a file from the parent device 81 without the need to include the SCSI-IDs of the child devices 83 and 85, which will each serve as a file recipient, in the host-mode execution program. The file transmission needs merely transmitting a single host-mode-setting command from the host computer 87 to the parent device 81.

In order for the host computer 87 to issue the host-mode-setting command, the user of the host computer 87 is required to enter a password for preventing a host mode from being set in any of the devices 81, 83, and 85 mistakenly by an unauthorized user. The magnetic-disc devices 81, 83, and 85 each have a program stored in the ROM 41 as a program that is capable of receiving a host-mode-setting command from the host computer 87. The program is capable of interpreting the command while any of the devices 81, 83, and 85 is operating in the device mode. Once the magnetic-disk device 81 has been selected by the host computer 87 to serve as a parent magnetic-disk device, only the device 81 interprets the host-mode-setting program and operates in the host mode in accordance with a subsequent procedure.

In a step 305 after the parent device 81 interprets the host-mode-setting command, the MPU 25 changes the event flag stored in the EEPROM 43 from the device mode, which has been indicating so far, to the host mode. Then, in the next processing block 307, the MPU 25 once turns off the power supply of the parent magnetic-disk device 81 before turning on it again to reactivate the parent magnetic-disk device 81. Subsequently, in the next processing block 309 after the parent device 81 has been reactivated, the MPU 25 refers to the event flag stored in the EEPROM 43, loads the host-mode execution program from the ROM 41 or the magnetic disk 11 to the RAM 39, and executes the host-mode execution program. The parent magnetic-disk device 81 operates in the host mode thereafter. The host-mode setting command may not include a command to reactivate the parent magnetic-disk device 81. In this case, the user may reactivate the parent magnetic-disk device 81 after the MPU 25 executes a command to set the event flag stored in the EEPROM 43 at a value representing the host mode. As an alternative, in the processing block 307, instead of turning off the power supply of the entire parent magnetic-disk device 81, only the power supply of the MPU 25 is turned off. Thereafter, the MPU 25 is turned on again to load the host-mode execution program into the RAM 39.

After migrating to the host mode, the parent magnetic-disk device 81 transfers a file to the child magnetic-disk device 83 or 85 by executing an SCSI command in accordance with the host-mode execution program in the next processing block 311. If the SCSI-ID of the child device 83 or 85 serving as a transfer destination has been stored in the EEPROM 43 in advance, the parent device 81 refers to the SCSI-ID at the reactivation time and is thus capable of determining the child device 83 or 85 as a transfer destination. Information such as the content of a file to be transferred and the transfer method are the same as those described earlier by referring to FIGS. 3 and 4. While a file is being transferred from the parent device to a child device, the host computer 87 issues a write command. The write command puts the I/O port in an input mode or a high-impedance state for caution's sake so as to prevent a file from being transferred from the host computer 87 to the child device.

In a processing block 313 after the transfer of the file is ended, the parent magnetic-disk device 81 transmits a status command indicating the end of the file transfer to the host computer 87. In response to this status command, the host computer 87 transmits a device-mode-setting command to the parent device 81 as a command for restoring the operating mode of the parent device 81 back to the device mode. The device-mode-setting command includes a sub-command for changing the event flag in the EEPROM 43 from the host mode back to the device mode and a sub-command for reactivating the parent magnetic-disk device 81. The file transfer described above provides a host computer having a plurality of magnetic-disk devices with convenience that, when a file needs to be exchanged between any of the devices, the file can be copied from the device containing the file to destination device without using the processor and memory of the host computer.

This embodiment has been explained by using three magnetic-disk devices as an example. In conformity with SCSI-3 specifications, however, the daisy chain using an SCSI cable can be used for connecting up to 32 magnetic-disk devices. Thus, even if four or more magnetic-disk devices are connected through the daisy-chain connection, one of them can be selected to function as a parent device. A file can be transmitted from the parent device to a child device, which can be arbitrarily selected from the other magnetic-disk devices. In addition, the child magnetic-disk device, which has received the transferred file, can be operated in the host mode to serve as a new parent magnetic-disk device. In accordance with the same procedure, the new parent device is capable of transferring a file to any other magnetic-disk devices, which are connected in the daisy chain, sequentially one device after another. The configuration in which a child magnetic-disk device having received a transferred file can be operated to serve as a new parent magnetic-disk device capable of transferring the file to any other magnetic-disk device is especially effective for the defragmentation copy explained earlier.

The SCSI-ID of a device connected in a daisy chain is a number unique to the device. When the parent device 81 transfers a file to a plurality of child devices sequentially one device after another, it is not necessary to change the daisy-chain connection for handling another child device as a next device to receive the file. The fact that it is not necessary to change the daisy-chain connection offers convenience. In the example described above, the parent magnetic-disk device 81 transfers a file first to the child magnetic-disk device 83 and then transfers to the child magnetic-disk device 85. While the parent device 81 is transferring the file to the child device 85, the child device 83 can be changed to another magnetic-disk device 91 not shown in the figure by assigning the SCSI-ID of the child device 83 to the other device 91. That is to say, the parent magnetic-disk device 81 is capable of transferring a file to newly connected magnetic-disk devices sequentially by using the SCSI-ID of the child device 83 or the child device 85. The SCSI-ID of a child magnetic-disk device can be set by using a jumper block or a dip switch.

Description of Cloning by Direct File Transfers Among Magnetic-Disk Devices

Figure 8:
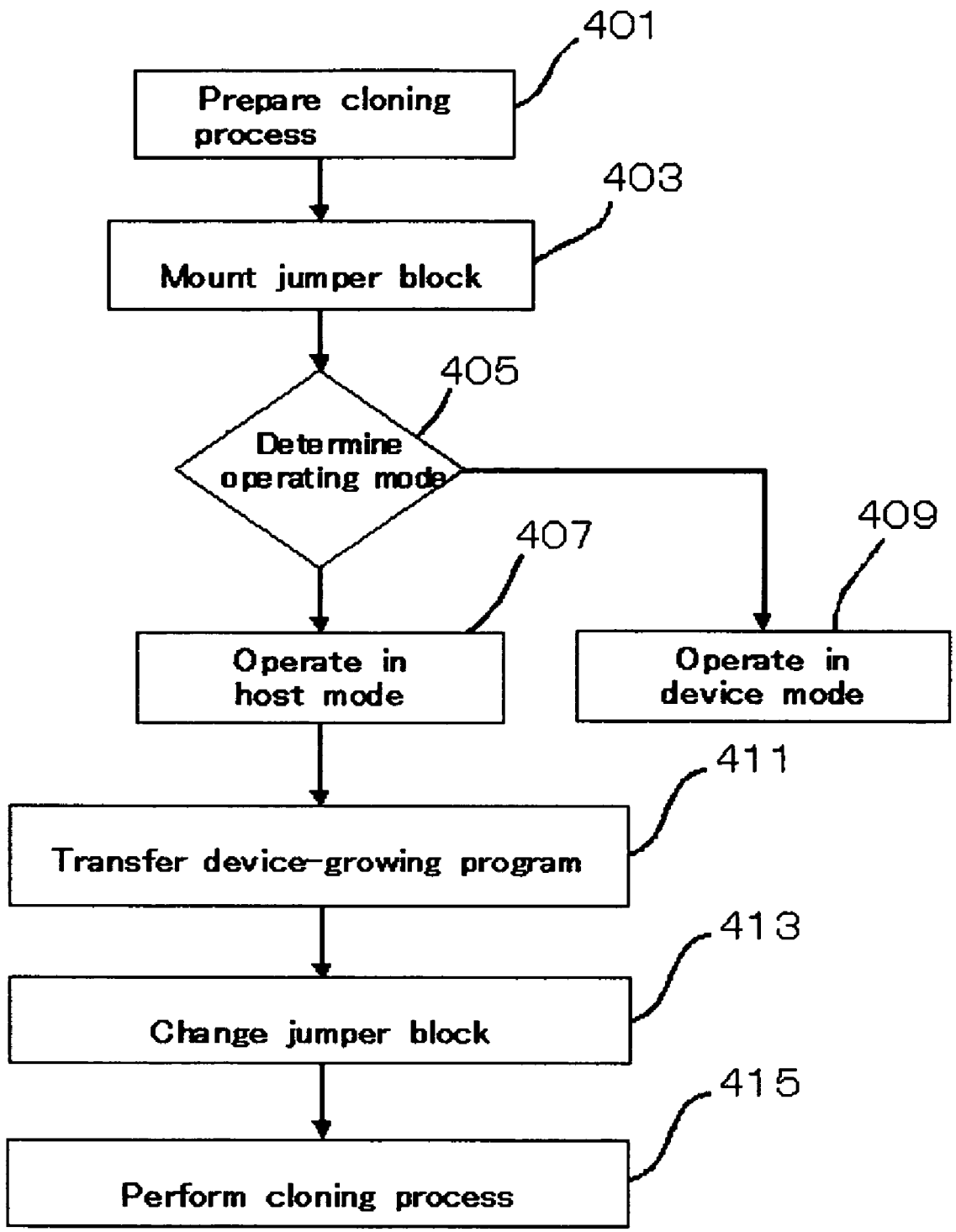
FIG. 8 shows a flowchart representing a procedure for generating a clone device by directly transferring files between magnetic-disk devices.

By referring to FIGS. 7 and 8, the following description explains an embodiment in which a parent magnetic-disk device grows a child magnetic-disk device into a clone of the parent device. The embodiment ports a device-growing program, which is used for carrying out optimization/inspection processes on the child device, from the parent device to the child device. The device-growing program utilizes the technology to directly transfer a file from the parent device to the child device as described earlier by referring to FIGS. 3 to 6. FIG. 7 is a diagram showing a connection for generating a clone device by directly transferring files between magnetic-disk devices. FIG. 8 shows a flowchart representing a procedure for generating the clone device. In the embodiment described below, a magnetic-disk device 111 serves as a parent magnetic-disk device whereas magnetic-disk devices 113 and 115 each function as a child magnetic-disk device.

The flowchart shown in FIG. 8 begins with a processing block 401 in which a preparation for a cloning process is carried out. As shown in FIG. 7, the three magnetic-disk devices 111, 113, and 115 are connected to each other. The devices 111, 113, and 115 each have all the same configuration as the magnetic-disk device 10 explained earlier by referring to FIG. 1 and adopt the ATA interface method. However, the devices 111, 113, and 115 are different from the device 10 in that the parent magnetic-disk device 111 includes an optimization/inspection program to be described later in the magnetic disk 11 thereof. In addition, the EEPROM 43 stores the know-how. The host-mode execution program of the parent device 111 as well as the child devices 113 and 115 has a function capable of handling the optimization/inspection program as well as the know-how.

Three connection apparatus 109a, 109b, and 109c are provided, being associated with the magnetic-disk devices 111, 113, and 115 respectively. The connection apparatus 109a has an interface connector 127a, a jumper connector 128a, a power-supply connector 129a, and a power-supply cable 125a connected to the power-supply connector 129a. By the same token, the connection apparatuses 109b, 109c have interface connectors 127b, 127c, jumper connectors 128b, 128c, power-supply connectors 129b, 129c, and power-supply cables 125b, 125c connected to the power-supply connectors 129b, 129c respectively. The interface connector 127a is connected to the interface connector 127b by using a cable 117 conforming to the ATA specifications. By the same token, the connector 127b is connected to the connector 127c by using another cable 117 conforming to the ATA specifications.

In general, a magnetic-disk device is different from an ordinary electronic apparatus in that, a perfect operation cannot be carried out by the magnetic-disk device resulting from an assembly process only. That is to say, it is necessary to carry out an optimization/inspection process on the magnetic-disk device over a long time period at the final manufacturing stage. The optimization/inspection process means either an optimization or an inspection process. The optimization/inspection process of a magnetic-disk device typically includes an operation to write servo information into the device, a preparatory inspection to optimize coefficients of various servo systems or coefficients of various channel systems, a verification test based on a long-run test for verifying functions and reliability, and a work of mapping defective sectors onto substitute sectors.

The parent magnetic-disk device 111 is a device that has completed such an optimization/inspection process. On the other hand, the child magnetic-disk devices 113 and 115 are each a device that has completed an assembly process and has been developed to a state enabling the device to communicate with the parent magnetic-disk device 111. However, the child magnetic-disk devices 113 and 115 still require the optimization/inspection process for making them complete products. The parent magnetic-disk device 111 has a variety of parameters stored in the EEPROM 43. The parameters have been obtained as a result of carrying out an optimization/inspection process by execution of an optimization/inspection program stored in the magnetic disk 11. A child magnetic-disk device is capable of inheriting the parameters stored in a parent magnetic-disk device to be used as parameters for gaining the so-called know-how of the parent magnetic-disk device.

In this specification, the parameters and/or the know-how, which are stored in the EEPROM 43, are combined with the optimization/inspection program stored in the magnetic disk 11 to form a device-growing program. The cloning process cited earlier is a process of porting the device-growing program from the parent magnetic-disk device to a child magnetic-disk device. The cloning process executes the device-growing program in the child device to grow the child device having the same personality as the parent device.

In a processing block 403, jumper blocks 119, 121, and 123 are mounted on the jumper connectors 128a, 128b, and 128c respectively. The magnetic-disk devices 111, 113, and 115 are connected to the connection apparatus 109a, 109b, and 109c respectively. The jumper block 119 is a special-purpose jumper block driving the parent magnetic-disk device 111 to operate in the host mode at a power-on time. On the other hand, the jumper blocks 121 and 123 are ordinary jumper blocks driving the child magnetic-disk devices 113 and 115 respectively to operate in the device mode at a power-on time. The jumper block 121 has a configuration for setting the child magnetic-disk device 113 to operate as a master device (device 0). The jumper block 123 has a configuration for setting the child magnetic-disk device 115 to operate as a slave device (device 1). Master and slave devices are technical terms used for distinguishing two magnetic-disk devices, which are connected to an ordinary host computer in accordance with the ATA specifications, from each other. Instead of using the special-purpose jumper block 119 and the general-purpose jumper blocks 121 and 123, it is possible to connect control circuits that allow the desired logic to be created in the jumper connectors 128a, 128b, and 128c.

In a processing block 405, the power supplies of the magnetic-disk devices 111, 113, and 113 are turned on to activate the devices 111, 113, and 115. The device 111 starts an operation in the host mode to function as a parent magnetic-disk device in a processing block 407. The devices 113 and 115 each start an operation in the device mode to function as a child magnetic-disk device in a processing block 409. In a processing block 411, the parent device 111 in which the host-mode execution program has been started up begins an operation to sequentially transfer a device-growing program for a cloning purpose to the child device 113 and the child device 115. The parent magnetic-disk device 111 transfers the device-growing program to a child magnetic-disk device by using an ATA command specifying the address of the child magnetic-disk device. The device-growing program is stored in the EEPROM 43 or magnetic disk device 11 of the child magnetic-disk device receiving the program. After the transfer of the device-growing program to a child magnetic-disk device is completed, the program can be transferred to another magnetic-disk device in accordance with the same procedure.

In a processing block 413 after the transfers of the device-growing program to the child devices 113 and 115 are completed, the jumper blocks 121, 123 on the connection apparatus 109b and 109c are each replaced with the special jumper block for setting the host mode. The special jumper blocks 119 put the child devices 113 and 115 in a configuration to operate in the host mode and have the host-mode execution program invoke the device-growing program. The child devices 113 and 115 execute the program, which is transferred by the parent device 111, to carry out the optimization/inspection process, inherit the know-how of the parent device 111, and become a complete magnetic-disk device in a processing block 415. The complete magnetic-disk devices 113 and 115 can each become a parent magnetic-disk device capable of growing another child magnetic-disk device to a clone of its own by following the same procedure.

Description of Optimization/Inspection Process between Magnetic-Disk Devices

Figure 9:
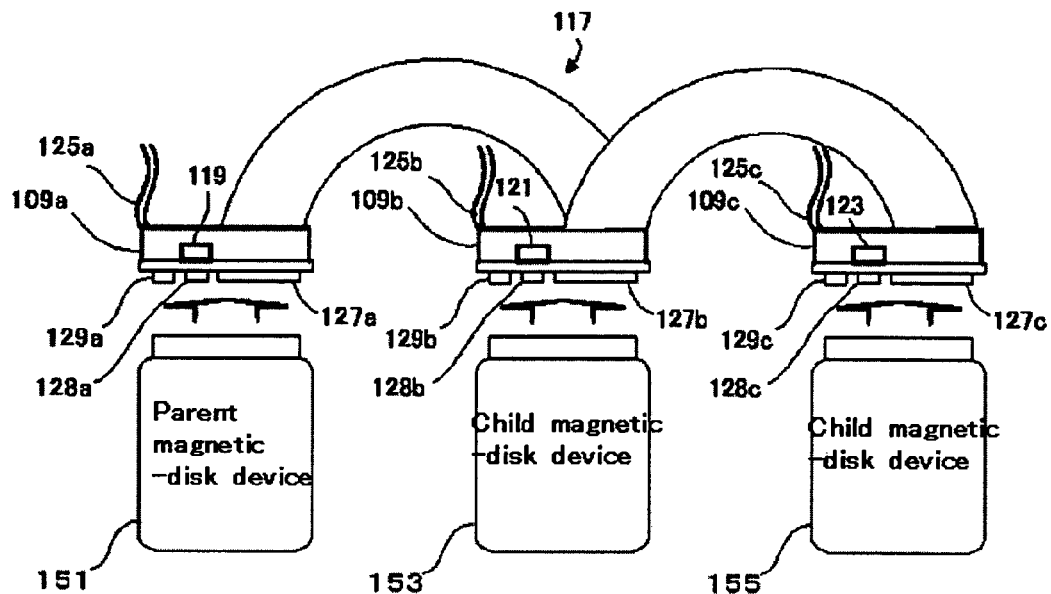
FIG. 9 is a diagram showing a connection in which an optimization/inspection process is carried out between magnetic-disk devices.
Figure 10:
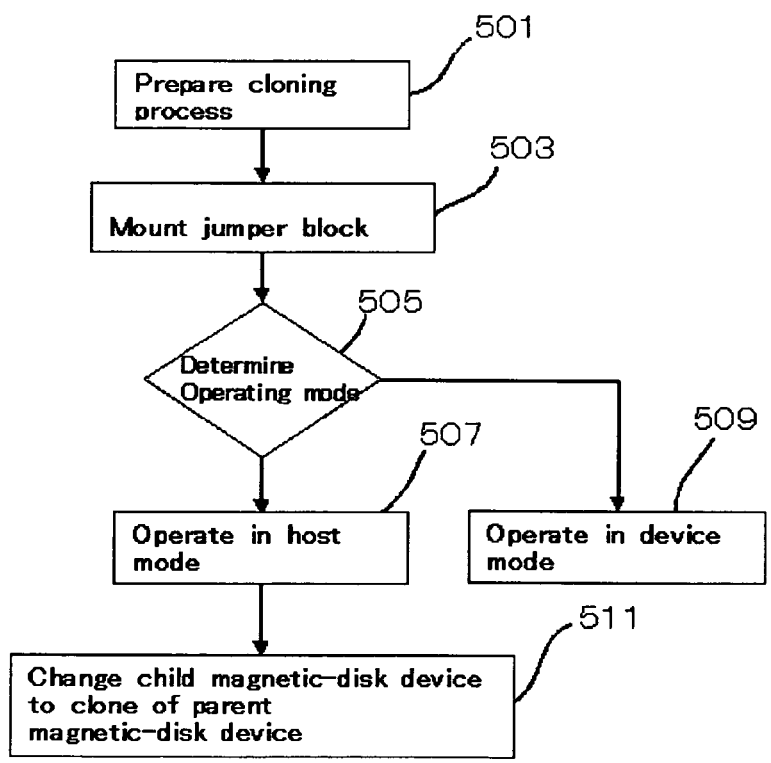
FIG. 10 shows a flowchart representing a procedure for carrying out an optimization/inspection process between magnetic-disk devices.

By referring to FIGS. 7 and 8, the above description has explained a method by which a parent magnetic-disk device transfers a device-growing program to a child magnetic-disk device. The child device executes the device-growing program. By referring to FIGS. 9 and 10, the following description explains a method provided by another embodiment. The method adopts a parent magnetic-disk device to grow a child magnetic-disk device by carrying out communications with the child device. FIG. 9 is a diagram showing a connection in which a parent magnetic-disk device grows a child magnetic-disk device by carrying out communications with the child device. FIG. 10 shows a flowchart representing a procedure adopted by the parent device to grow the child device. In the embodiment described below, a magnetic-disk device 151 serves as a parent magnetic-disk device, whereas magnetic-disk devices 153 and 155 each function as a child magnetic-disk device.

The flowchart shown in FIG. 10 begins with a processing block 501 in which a preparation for a cloning process is carried out. The only difference between the connections shown in FIGS. 7 and 9 is a difference in internal configurations between the three magnetic-disk devices 151, 153, and 155 and the devices 111, 113, and 115 respectively. Since the other elements remains unchanged, their explanations are not repeated. The magnetic-disk devices 151, 153, and 155 each have all the same configuration as the magnetic-disk device 10 explained earlier by referring to FIG. 1 and adopt the ATA interface method. However, the magnetic-disk devices 151, 153, and 155 are different from the magnetic-disk device 10 in that the device 151 includes an education program to be described later in the magnetic disk 11 thereof. The parent magnetic-disk device 151 as well as the child magnetic-disk devices 153 and 155 each have a function capable of handling the education program.

As described above, the parent device 151 includes an education program in the magnetic disk 11 thereof as a program to carry out an optimization/inspection process on a child device while communicating with the child device. The education program is typically an operation to write servo information into the magnetic-disk device, a preparatory inspection of optimizing coefficients of various servo systems or coefficients of various channel systems, a verification test based on a long-run test for verifying functions and reliability, and a work of mapping defective sectors onto substitute sectors.

The parent device 151 is a magnetic-disk device that has completed such an optimization/inspection process. On the other hand, the child devices 153 and 155 are each a magnetic-disk device that has completed an assembly process and has been developed to a state enabling communication with the parent device 151 in order to get education from the parent device 151. However, the child magnetic-disk devices 153 and 155 still require the optimization/inspection process for making them complete products. The parent magnetic-disk device 151 has a variety of parameters stored in the EEPROM 43. The parameters have been obtained as a result of carrying out the optimization/inspection process.

Processing blocks 503 to 509 of the flowchart shown in FIG. 10 compose the same procedure as the processing blocks 403 to 409 respectively. The parent magnetic-disk device 151 starts operations in the host mode, whereas the child magnetic-disk devices 153 and 155 each start operations in the device mode. In a processing block 511, the education program is executed to start operations to educate a child device to become a clone of the parent device 151. The parent device 151 specifies the address of the child device, transfers firmware and writes the servo information to a child device by using an ATA command, and carries out optimization/inspection on the child device. In these operations, know-how stored in the EEPROM 43 employed in the parent magnetic-disk device 151 is also ported to the child magnetic-disk device. After the optimization/inspection process is sequentially carried out on the child devices 153 and 155 to grow the child magnetic-disk devices, the education process is ended. Traditionally, a child magnetic-disk device is connected to an inspection apparatus for executing an education program on the child magnetic-disk device. In this embodiment, however, the parent magnetic-disk device 151 can be operated as the inspection apparatus, making the actual inspection apparatus unnecessary. Thus, the investment in the inspection apparatus can be eliminated. In addition, the magnetic-disk devices 153 and 155 completing the education process can each become a parent magnetic-disk device capable of educating another child magnetic-disk device.

The descriptions given so far take a magnetic-disk device as an example of a storage device. However, the present invention can be applied to a variety of external storage devices and a variety of auxiliary storage devices as long as the devices each have a processor. Examples of such storage devices include an opto-magnetic-disk device, a floppy-disk device, a CD device, a DVD device, and a PD device. In addition, as described above, a file is transferred between a parent magnetic-disk device and a child magnetic-disk device or between a parent magnetic-disk device and a host computer in typical cases of using wire communication. However, a file can also be transferred through radio communication as well. In addition, a data transmission line for transferring a file between magnetic-disk devices may conform to any of the ATA, serial-ATA, SCSI, and Fibre-Channel specifications.

A method of transferring a file between a parent magnetic-disk device and a child magnetic-disk device in accordance with the command issued by the host computer has been described by taking the SCSI interface as an example in FIGS. 5 and 6. A method of directly transferring a file between the magnetic-disk devices connected by the Fibre-Channel is described. Assume that eight magnetic-disk devices 1 to 8 are initially connected in the daisy-chain through SCSI interfaces in the system shown in FIG. 5. The magnetic-disk device 1 functions as the parent magnetic-disk device sequentially transmits a file of the parent device to the remaining seven magnetic-disk devices 2 to 8. The devices 2 to 8 serve as a child magnetic-disk device.

The host-mode execution program of the parent magnetic-disk device includes code to be executed for sequentially transmitting a file to the remaining seven magnetic-disk devices 2 to 8, which each serve as a child magnetic-disk device, one device after another. First of all, when the host computer designates the parent magnetic-disk device 1 in the host mode, the parent magnetic-disk device 1 sequentially transmits a file to the remaining seven child magnetic-disk devices 2 to 7. In the operations to transmit the file to the remaining seven magnetic-disk devices 2 to 8 one device after another, the parent magnetic-disk device 1 transmits the file in accordance with a connection procedure of the bus connecting the magnetic-disk devices 2 to 8. The file transmission consumes the time till the transfer of the file is completed.

Figure 11:
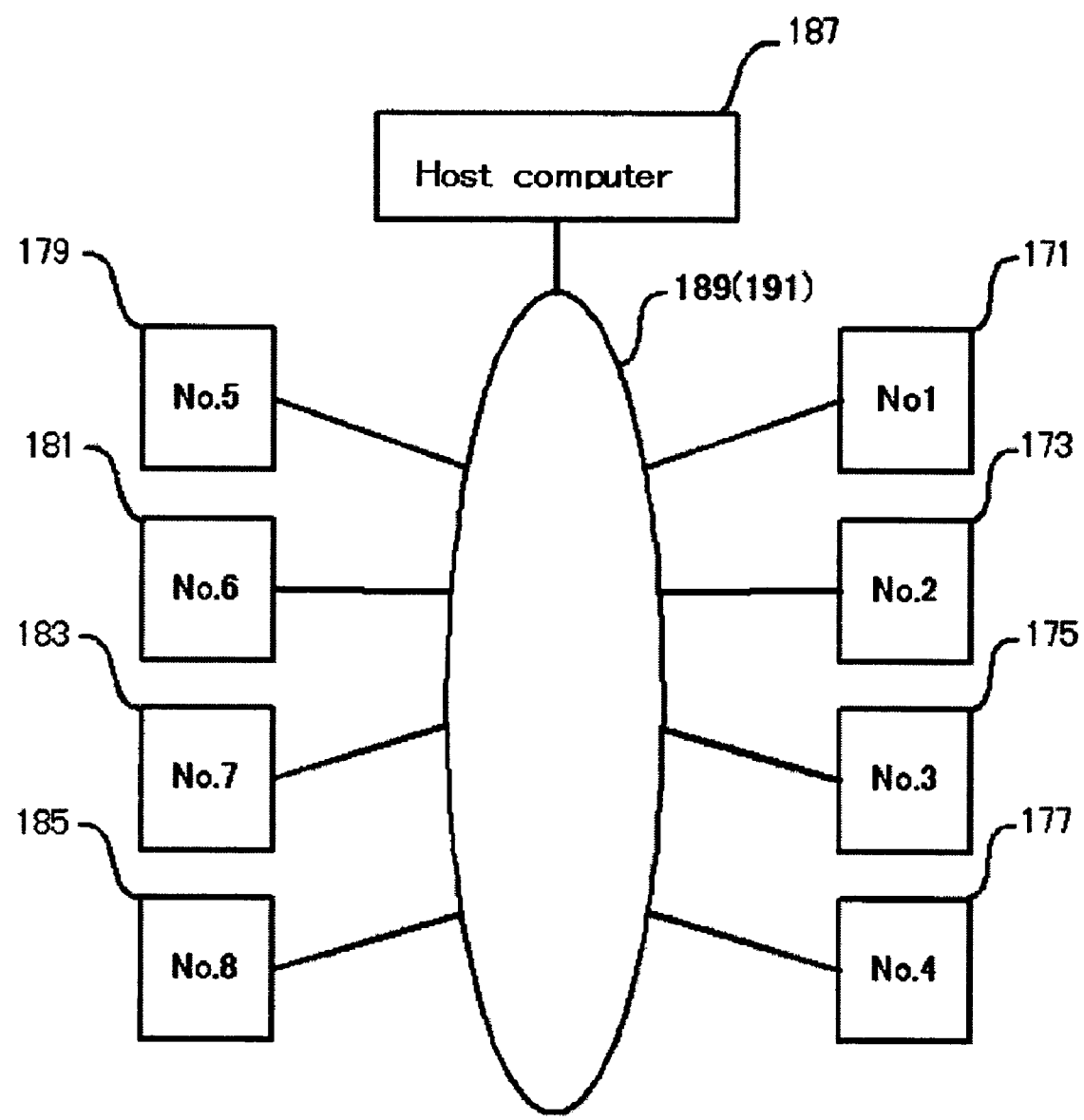
FIG. 11 is a diagram showing a configuration in which a host computer is connected to magnetic-disk devices by using a fibre channel or a fabric switch.

FIG. 11 is a diagram showing a configuration in which a host computer 187 is connected to magnetic-disk devices 171 to 185 by using an arbitrated loop 189. Data can be transferred by adoption of a communication protocol conforming to the Fibre-Channel specifications. Assume that the first magnetic-disk device 171 is the parent magnetic-disk device having a stored file to be transferred whereas the second to eighth magnetic-disk devices 173 to 185 are each a child magnetic-disk device to receive the file. The parent magnetic-disk device 171 and the child magnetic-disk devices 173 to 185 each have a host-mode execution program for executing a procedure to be described below and an interface with the arbitrated loop 189. The parent magnetic-disk device 171 and the child magnetic-disk devices 173 to 185 each have the same configuration as the magnetic-disk device 10 shown in FIG. 1. The parent magnetic-disk device 171 operates in the host mode, while the child magnetic-disk devices 173 to 185 each operate in the device mode. The host computer 187 issues an inquiry about a WWN (World Wide Name) of each of the child devices 173 to 185 to each of the devices 173 to 185 respectively and reports results of the inquiries to the parent device 171 in advance. Assume that each of the magnetic-disk devices 171 to 185 initially operates in the device mode. Then, the host computer 187 transmits a host-mode-setting command to the parent magnetic-disk device 171. The host-mode-setting command includes a sub-command for setting the host mode in the event flag stored in the EEPROM 43 and a sub-command for reactivating the parent magnetic-disk device 171.

Then, the parent magnetic-disk device 171 is reactivated to operate in the host mode. The host-mode execution program stored in the ROM includes a procedure for transferring a file from the parent magnetic-disk device 171 to the child magnetic-disk devices 173 to 185. In accordance with this procedure, the parent magnetic-disk device 171 reads out data n1, which is a part of the file to be transferred, from the magnetic disk 11. In addition, the device 171 stores the data in a cache and adds the identifier of the child magnetic-disk device 173 to the data before outputting the data to the arbitrated loop 189. The data n1 output to the arbitrated loop 189 propagates along the arbitrated loop 189 and passes through the child magnetic-disk devices 173 to 185. However, only the child magnetic-disk device 173 that has the matched identifier reads the data n1 and stores at a specified address in the magnetic disk 11 employed in the child device 173.

Subsequently, the parent magnetic-disk device 171 adds the identifier of the child magnetic-disk device 175 to the data n1 extracted from the cache and outputs the data to the arbitrated loop 189. This time, the data n1 is received only by the child magnetic-disk device 175 that has the matched identifier and stored at a specified address in the magnetic disk 11 employed in the child device 175. By the same token, the data n1 is received by the magnetic-disk devices 177 to 185 sequentially and stored at a specified address in the magnetic disk 11 employed in each of the magnetic-disk devices 177 to 185. After transferring the data n1, the parent magnetic-disk device 171 reads out data n2, which is another part of the file to be transferred, from the magnetic disk 11 employed in the parent magnetic-disk device 171. The device 171 stores the data in the cache and adds the identifier of the child magnetic-disk device 173 to the data before outputting the data to the arbitrated loop 189. The data n2 output to the arbitrated loop 189 is received only by the child magnetic-disk device 173, because the identifier of the device 173 matches the identifier added to the data. The data n2 is stored at a specified address in the magnetic disk 11 employed in the child magnetic-disk device 173.

Subsequently, the parent magnetic-disk device 171 adds the identifier of the child magnetic-disk device 175 to the data n2 and outputs the data to the arbitrated loop 189. Thereafter, by repeating this procedure in the same way, the parent magnetic-disk device 171 is capable of transmitting not only the data n1, but also the data n2, data n3, and so on to the child magnetic-disk devices 173 to 185. The data are each a part obtained as a result of splitting the file being transferred. In accordance with the Fibre-Channel specifications, the bus connection procedure is not required. Thus, data can be transferred at a high speed. The amount of each of the data n1, the data n2, and so on, which are data output to the arbitrated loop 189 at a one time, is the size of a selected data unit. The data unit can be a sector unit, a cluster unit, a unit determined by the aforementioned catch employed in the magnetic-disk device, or a unit determined by a communication protocol prescribed by the Fibre-Channel specifications. When the child magnetic-disk devices 173 to 185 completing the data transfer are each changed to serve as a new magnetic-disk device, the host computer 187 again issues an inquiry about a WWN to each of the new child magnetic-disk devices 173 to 185. Then, the host computer 187 reports results of the inquiries to the parent magnetic-disk device 171. In this method, a fabric switch to be described below can also be used as a substitute for the arbitrated loop 189.

As another method of transferring a file, it is also possible to adopt a technique whereby a child magnetic-disk device having received a file transferred from a first parent magnetic-disk device is operated as a new parent magnetic-disk device. Therefore, the child device transmits the file to other child magnetic-disk devices in collaboration with the first parent magnetic-disk device. In this other method, a fabric switch 191 is used as a substitute for the arbitrated loop 189 as shown in FIG. 11. The host computer 187 and the magnetic-disk devices 171 to 185 transfer files in accordance with a communication protocol conforming to the fabric switch 191. Such a system is disclosed in Japanese Patent Laid-open No. 2002-3422253 and Japanese Patent Laid-open No. 2000-222339. In the system employing a fabric switch 191 as shown in FIG. 11, it is possible to form a plurality of pairs each consisting of devices involved in a data transfer so as to carry out multi communications.

In accordance with this method, the magnetic-disk device 171 serves as a parent magnetic-disk device in the host mode transferring a file to the child magnetic-disk device 173. Then, the child magnetic-disk device 173 becomes a parent magnetic-disk device transferring the file to another child magnetic-disk device in collaboration with the parent magnetic-disk device 171 in a configuration comprising two pairs of data transfers. To be more specific, the parent magnetic-disk device 171 transfers the file to the child magnetic-disk device 175, and the parent magnetic-disk device 173 transfers the file to the child magnetic-disk device 177.

Subsequently, the child magnetic-disk devices 175 and 177 each become a parent magnetic-disk device transferring the file to another child magnetic-disk device in the host mode in collaboration with the parent magnetic-disk devices 171 and 173 in a configuration comprising four pairs of data transfers from the parent magnetic-disk devices 171 to 177 to the remaining child magnetic-disk devices 179 to 185. To be more specific, the parent magnetic-disk device 171 transfers the file to the child magnetic-disk device 179, the parent magnetic-disk device 173 transfers the file to the child magnetic-disk device 181, the parent magnetic-disk device 175 transfers the file to the child magnetic-disk device 183 and the child magnetic-disk device 177 transfers the file to the child magnetic-disk device 185.

In accordance with this method, a plurality of device pairs each involved in a transfer of a file from a parent magnetic-disk device to a child magnetic-disk device are formed at the same time. A file can be transferred through a fabric switch on a time-sharing basis. In this way, a file can be transferred from the parent magnetic-disk device 173 to the child magnetic-disk device 177 without waiting for completion of a transfer of the file from the parent magnetic-disk device 171 to the child magnetic-disk device 175. Accordingly, the time it takes to transfer the files with respect to the all magnetic-disk devices can be reduced substantially.

In order to change the operating mode of a child magnetic-disk device from the device mode to the host mode so as to operate the child magnetic-disk device as a new parent magnetic-disk device, it is necessary for the host computer 187 to transmit a reactivation command to the child magnetic-disk device as a command for reactivating the child magnetic-disk device. Thus, in comparison with a case in which a parent magnetic-disk device already operating in the host mode changes a child magnetic-disk device serving as a file-transfer target to a new parent magnetic-disk device, a new parent magnetic-disk device reactivated by the host computer 187 starts a transfer of the file at a time delayed by the time it takes to reactivate the new parent magnetic-disk device. Since it takes longer time to transfer a file having a large size than the time required to reactivate a magnetic-disk device as a new parent magnetic-disk device, however, by adoption of this method, a file can be transferred at a high speed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A storage device for storing a file, said storage device comprising:
    an operating-mode-setting unit configured to set a host mode or a device mode;
    a non-volatile recording medium configured to store a device-mode execution program and a host-mode execution program; and
    a storage device processor configured to read out and execute said host-mode execution program in said host mode upon reference to an operating mode set by said operating-mode-setting unit upon a power-on time,
    wherein said storage device processor controls said storage device to automatically carry out a direct transfer of a file between said storage device and another storage device operating in said device mode at said power-on time without intervention from a host computer,
    wherein said storage device and said other storage device are directly connected to each other via a cable and without an intermediate connector;
    wherein said operating-mode-setting unit includes a jumper connector for setting either said storage device or said other storage device in either said host mode or said device mode,
    wherein said file is a device-growing program for driving said other storage device to carry out an optimization/inspection process.

2. The storage device according to claim 1 wherein said operating-mode-setting unit includes a non-volatile memory.

3. The storage device according to claim 1 wherein said operating-mode-setting unit includes a logic gate.

4. The storage device according to claim 1 wherein said recording medium comprises a rotating disc recording medium.

5. The storage device according to claim 1 wherein said direct transfer of a file is a transfer of said file from said storage device to said other storage device.

6. The storage device according to claim 1 wherein said direct transfer of a file is a transfer of said file from said other storage device to said storage device.

7. The storage device according to claim 1 wherein said direct transfer of a file is a dead copy of said file from a recording medium employed in a specific one of said storage device and said other storage device to a recording medium employed in the other one of said storage device and said other storage device.

8. The storage device according to claim 1 wherein said direct transfer of a file is a defragmentation copy of said file from a recording medium employed in a specific one of said storage device and said other storage device to a recording medium employed in the other one of said storage device and said other storage device.

9. The storage device according to claim 1 wherein said file is drive and operation information of said storage device or said other storage device or either of said drive information and said operation information.

10. The storage device according to claim 1, said storage device carrying out said direct transfer of a file with a plurality of other storage devices each capable of operating in said device mode, wherein said host-mode execution program selects one of said other storage devices as a partner of said direct transfer of a file.

11. The storage device according to claim 1, said storage device further having a display unit to display a state of a file transfer.

12. A storage device connectable to a data transmission circuit connected to a host computer, said storage device comprising:
    a recording medium configured to store a file;
    a first non-volatile recording medium configured to store a setting of an operating mode as a result of execution of a host-mode setting command received from said host computer;
    a second non-volatile recording medium configured to store a device-mode execution program and a host-mode execution program; and
    a processor configured to control configuration elements of said storage device so as to start an operation in a host mode or device mode upon reference to an operating mode set in said first non-volatile recording medium upon a power-on time and carry out a direct transfer of a file through said data transmission circuit between said storage device and another storage device operating in a host mode or device mode without intervention from a host computer;
    wherein said storage device and said other storage device are directly connected to each other via a cable and without an intermediate connector,
    wherein said file is a device-growing program for driving said other storage device to carry out an optimization/inspection process.

13. The storage device according to claim 12 wherein said processor executes a command received from said host computer to again turn on a power supply of said processor.

14. A method to carry out an optimization/inspection process of a storage device, said method comprising:
    providing a first storage device capable of storing a device-growing program and a set value of a host mode or a set value of a device mode;
    providing a second storage device capable of storing a set value of a host mode or a set value of a device mode;
    connecting said first storage device to said second storage device to make said first storage device and said second storage device capable of communicating with each other without invention from a host computer;
operating said second storage device in said device mode;
setting said first storage device in said host mode and turning on a power supply of said first storage device;
letting said first storage device start operations in said host mode in response to said step of turning on said power supply of said first storage device;
transferring said device-growing program from said first storage operating in said host mode to said second storage device operating in said device mode;
storing said device-growing program in said second storage device;
setting said second storage device in said host mode and turning on a power supply of said second storage device;
letting said second storage device start operations in said host mode in response to said step of turning on said power supply of said second storage device; and
letting said second storage device execute said device-growing program to carry out said optimization/inspection process
wherein first storage device and the second storage device are directly connected to each other via a cable.

15. The method to carry out an optimization/inspection process in accordance with claim 14, said method further comprising letting said second storage device further transfer said device-growing program received from said first storage device to a third storage device.

* * * * *